US010248614B1

(12) United States Patent
Delaet et al.

(10) Patent No.: US 10,248,614 B1
(45) Date of Patent: Apr. 2, 2019

(54) GENERATING SEGMENTED NOTIFICATIONS IN A VIRTUAL SPACE

(71) Applicant: KABAM, INC., San Francisco, CA (US)

(72) Inventors: Michael C. Delaet, Foster City, CA (US); Robert Oshima, Orinda, CA (US); Kellen Christopher Smalley, Pleasanton, CA (US)

(73) Assignee: Kabam, Inc., San Francisco, CA (US)

( * ) Notice: Subject to any disclaimer, the term of this patent is extended or adjusted under 35 U.S.C. 154(b) by 807 days.

(21) Appl. No.: 14/145,668

(22) Filed: Dec. 31, 2013

(51) Int. Cl.
G06F 15/173 (2006.01)

(52) U.S. Cl.
CPC ...... *G06F 15/173* (2013.01); *A63F 2300/575* (2013.01)

(58) Field of Classification Search
CPC .......................... A63F 13/12; A63F 2300/575
See application file for complete search history.

(56) References Cited

U.S. PATENT DOCUMENTS

| | | | |
|---|---|---|---|
| 8,137,193 B1 | 3/2012 | Kelly et al. ................ 463/31 |
| 8,303,416 B1* | 11/2012 | Thakkar .............. A63F 13/12 463/42 |
| 8,439,759 B1 | 5/2013 | Mello et al. ................ 463/42 |
| 8,840,465 B2 | 9/2014 | Mello et al. ................ 463/29 |
| 2005/0009600 A1 | 1/2005 | Rowe et al. ................ 463/29 |
| 2005/0137015 A1* | 6/2005 | Rogers ............... A63F 13/12 463/42 |
| 2007/0265091 A1 | 11/2007 | Aguilar, Jr. et al. .......... 463/42 |
| 2008/0090659 A1 | 4/2008 | Aguilar et al. ............. 463/42 |
| 2008/0188308 A1 | 8/2008 | Shepherd et al. ............ 463/39 |
| 2008/0207327 A1 | 8/2008 | Van Luchene et al. ....... 463/42 |
| 2009/0088259 A1 | 4/2009 | Gosztyla et al. ............ 463/43 |
| 2009/0104954 A1 | 4/2009 | Weber et al. ................. 463/1 |

(Continued)

OTHER PUBLICATIONS

'HappyTC Demo'. From Wayback Machine Internet Archive [online]. Dec. 1, 2007 [retrieved on Aug. 3, 2017]. Retrieved from the Internet: <URL:https://web.archive.org/web/20071201155431/http://www.happytc.com:80/htc/k/demo/?long=1>.*

(Continued)

*Primary Examiner* — Sm A Rahman
*Assistant Examiner* — Dae Kim
(74) *Attorney, Agent, or Firm* — Sheppard Mullin Richter & Hampton LLP

(57) ABSTRACT

A system and method for facilitating segmented notifications relating to a virtual space are disclosed. Such notifications may be segmented for different user segments within the virtual space. In some examples, the segmentation of the notification may be at least in part with respect to contents included in notification for different user segments. The content segmentation may be with respect to a communication style, pattern, format, a language expressed in, one or more culture references used and/or any other aspects related to contents that may be included in notifications for the different user segments. In some examples, the notifications may include incentive offers and may be segmented with respect to parameters of the incentive offers for presentation to the different user segments. In some implementations, transmission frequencies for transmitting notifications to the different user segments may be determined.

20 Claims, 3 Drawing Sheets

(56) References Cited

U.S. PATENT DOCUMENTS

| | | | |
|---|---|---|---|
| 2009/0131151 A1 | 5/2009 | Harris et al. ................... | 463/22 |
| 2010/0005480 A1 | 1/2010 | Mallempati et al. ......... | 719/318 |
| 2010/0203963 A1 | 8/2010 | Allen et al. ................... | 463/30 |
| 2010/0229106 A1 | 9/2010 | Lee et al. ...................... | 715/757 |
| 2011/0312423 A1 | 12/2011 | Mosites et al. ................ | 463/42 |
| 2012/0040746 A1 | 2/2012 | Auterio et al. ................ | 463/25 |
| 2012/0110477 A1 | 5/2012 | Gaume ......................... | 715/757 |
| 2013/0005480 A1 | 1/2013 | Bethke et al. ................. | 463/42 |
| 2013/0035991 A1* | 2/2013 | Romero ............. | G06Q 30/0224 |
| | | | 705/14.1 |
| 2013/0079144 A1* | 3/2013 | Ahmed .................. | A63F 13/87 |
| | | | 463/42 |
| 2013/0090171 A1* | 4/2013 | Holton ................... | A63F 13/63 |
| | | | 463/42 |
| 2013/0254278 A1* | 9/2013 | Buhr ..................... | G06Q 50/01 |
| | | | 709/204 |
| 2013/0304581 A1 | 11/2013 | Soroca et al. ............. | 705/14.64 |
| 2013/0339228 A1* | 12/2013 | Shuster .................. | G06F 9/541 |
| | | | 705/40 |
| 2014/0031117 A1 | 1/2014 | Mello et al. .................... | 463/31 |
| 2014/0100020 A1* | 4/2014 | Carroll ................... | A63F 13/12 |
| | | | 463/25 |
| 2014/0128156 A1* | 5/2014 | Morioka ................ | A63F 13/10 |
| | | | 463/29 |
| 2014/0278844 A1* | 9/2014 | Khanna ................ | A63F 13/795 |
| | | | 705/14.4 |

OTHER PUBLICATIONS

"Segmentations & Targeting", printed from http://www.appoxee.com/products/segmentation, printed Nov. 21, 2013, copyrighted 2013 Appoxee, Inc., 2 pages.

\* cited by examiner

GENERATING SEGMENTED NOTIFICATIONS IN A VIRTUAL SPACE

FIELD OF THE DISCLOSURE

This disclosure relates to generating notifications in a virtual space, the notifications being generated based on user parameters related to individual users of the virtual space.

BACKGROUND

Generating notifications for notifying users about events or activities taking place in a virtual space is known. Generating notifications reminding users to participate in the virtual space is known. Some systems enable users to control settings of notifications that may be generated for the users. For example, in those systems, a given user may select virtual space events and/or activities of interest to be included in the notifications. In those systems, the notifications are typically transmitted to the given user through a graphical user interface while the user is participating in the virtual space, or through push notifications while the user is not participating in the virtual space.

SUMMARY

One aspect of the disclosure relates to generating segmented notifications in a virtual space based on user parameters relating to individual users. Notifications about information related to the virtual space may be segmented and transmitted to different user segments of the virtual space. The user segments may be distinguished by parameter values for a set one or more user parameters. The user parameters may include, but not limited to, a language spoken, a level of spending, a level of experience related to the virtual space, a level of virtual space activity, a time zone, an age group, a geographical location, and/or any other user parameters related to the individual ones of the users of the virtual space. In some examples, notifications may be segmented with respect to contents included in the notifications for different user segments. The contents included in the segmented notifications may be differentiated with respect to, for example, but not limited to, a communication style, communication pattern, communication format, level of details, language expressed in, communication media, and/or any other aspects related to contents included in the segmented notifications.

In some implementations, incentive offers may be included in the segmented notifications. The incentive offers may include offers of virtual items usable in the virtual space in exchange of stored consideration from the users. In those implementations, the notifications including such incentive offers may be segmented for different user segments with respect to one or more offer parameters, for example, but not limited to, a price, a discount, a quantity and/or any other offer parameters. In some implementations, different notification frequencies for transmitting the segmented notifications to the user segments may be determined. This may motivate users to progress in the virtual space to receive enhanced notifications. This may enhance user experience by adapting notifications to specific characteristics associated with different user segments. This may enhance monetization opportunities for the providers of the virtual space as incentive offers may be targeted at different user segments through the segmented notifications.

A system configured for generating segmented notifications in a virtual space may include a server. The server may operate in a client/server architecture with one or more client computing platforms. The client computing platforms may be associated with the users of the virtual space. The server may be configured to execute one or more of a space component, a user component, notification generation component, a notification frequency determination component, notification transmission component and/or other components.

The space components may be configured to execute an instance of the virtual space in which an online game takes place. The space component may facilitate user interaction with the virtual space by receiving user commands from client computing platforms associated with the users of the online game. Within the instance of the virtual space executed by space component, the users may participate in the instance of the virtual space by controlling one or more of an element in the virtual space. The users may input commands with specific parameters to undertake specific deeds, actions, functions, sphere of actions and/or any other types of interactions within the virtual space.

The user component may be configured to access and/or manage one or more user profiles and/or user information associated with users of the system. The user information associated with a given user may comprise one or more user parameters related to the given users. The one or more user parameters may include, but not limited to, a language spoken by, a time zone associated with, a level of experience in the virtual space by, a level of activity level of a given user, and/or any other user parameters associated with the given user. The user information managed by the user component may indicate a first user segment having a first parameter value associated with a first user parameter; and second user segment having a second parameter value associated with the first user parameter.

The notification generation component may be configured to generate notifications to notify individual users of information related to the virtual space. The notifications generated by notification generation component may notify the individual users of events, activities, news, updates, and/or any other types of state change within the virtual space. In some examples, the notifications generated by notification generation component may convey information to remind individual users to participate in the virtual space. In some examples, the notifications generated by notification generation component may include incentive offers offering virtual items in exchange of stored consideration from the users. The notifications presenting such offers may facilitate the users to accept the offers by transferring the stored consideration from the user accounts to the provider of the virtual space, a third party in connection with the virtual space, and/or any other entities that are in connection with offers of the virtual items included in the notifications.

The notification generation component may segment the notifications described above for different user segments within the virtual space. In some examples, a given notification about a state change in the virtual space may be segmented for transmission to different user segments with respect to at least contents included in the given notification for different user segments. The contents included in such a notification for different user segments may be differentiated based on parameter values for the set of one or more parameters that segment the users. Such content differentiation may include differentiation in terms of communication style, format, pattern, and/or any other aspects related to communication of the notification to the user segments, in terms of a language the contents in the notification are expressed in, in terms of culture references used in the contents of the notification, in terms of a level of detail of the contents in the notification and/or differentiation in terms of any other aspects related to the contents in the notification.

The notification frequency determination component may be configured to determine notification frequencies at which the notifications generated by the notification generation component may be transmitted to the corresponding users. For different user segments, the notification frequency determination component may determine different notification frequencies for transmitting notifications generated by the notification generation component to the different user segments. For example, the notification frequency determination component may determine a first frequency at which a notification conveying a given piece of information may be transmitted to a first user segment; and a second frequency, different from the first frequency, at which the notification may be transmitted to a second user segment.

In some implementations, the notification generation component may be configured to determine incentive offers for inclusion in the segmented notifications. The determination of a given incentive offer for inclusion in segmented notifications may involve a determination which virtual item(s) may be included in incentive offers, a determination of the size of discounts included in the incentive offers, a determination of prices for the virtual items included in the incentive offers, and/or a determination of any other offer parameters of incentive offers for inclusion in the notifications. The incentive offers included in the notification may be segmented for different user segments. For example, the price of a particular virtual item that is on sale in a virtual store within the virtual space may be differentiated in notifications generated for different user segments.

The notification transmission component may be configured to effectuate transmission of notifications through electronic communication media internal and/or external to virtual space. This may include determining one or more of communication media through which the notification may be transmitted to the corresponding users, and/or other aspects of the notifications. Determining the communication media may include selecting one or more communication media, e.g., email, text, instant message, push notification, and/or other media for a given notification to the corresponding users. Notification transmission component 120 may effectuate transmission of notifications to different user segments using different communication media. Communication media external to the virtual space may include communication media not relayed to the users by a server included in the system. In some implementations, records of such transmissions may be made (e.g., in the user accounts). The records may include information about one or more of a format of the notifications, the state changes that triggered the notifications, the content in the notifications, communication media used to transmit the notifications, and/or other information about the notifications. These records may be used by space component, notification generation component, used by notification frequency determination component, and/or other modules.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
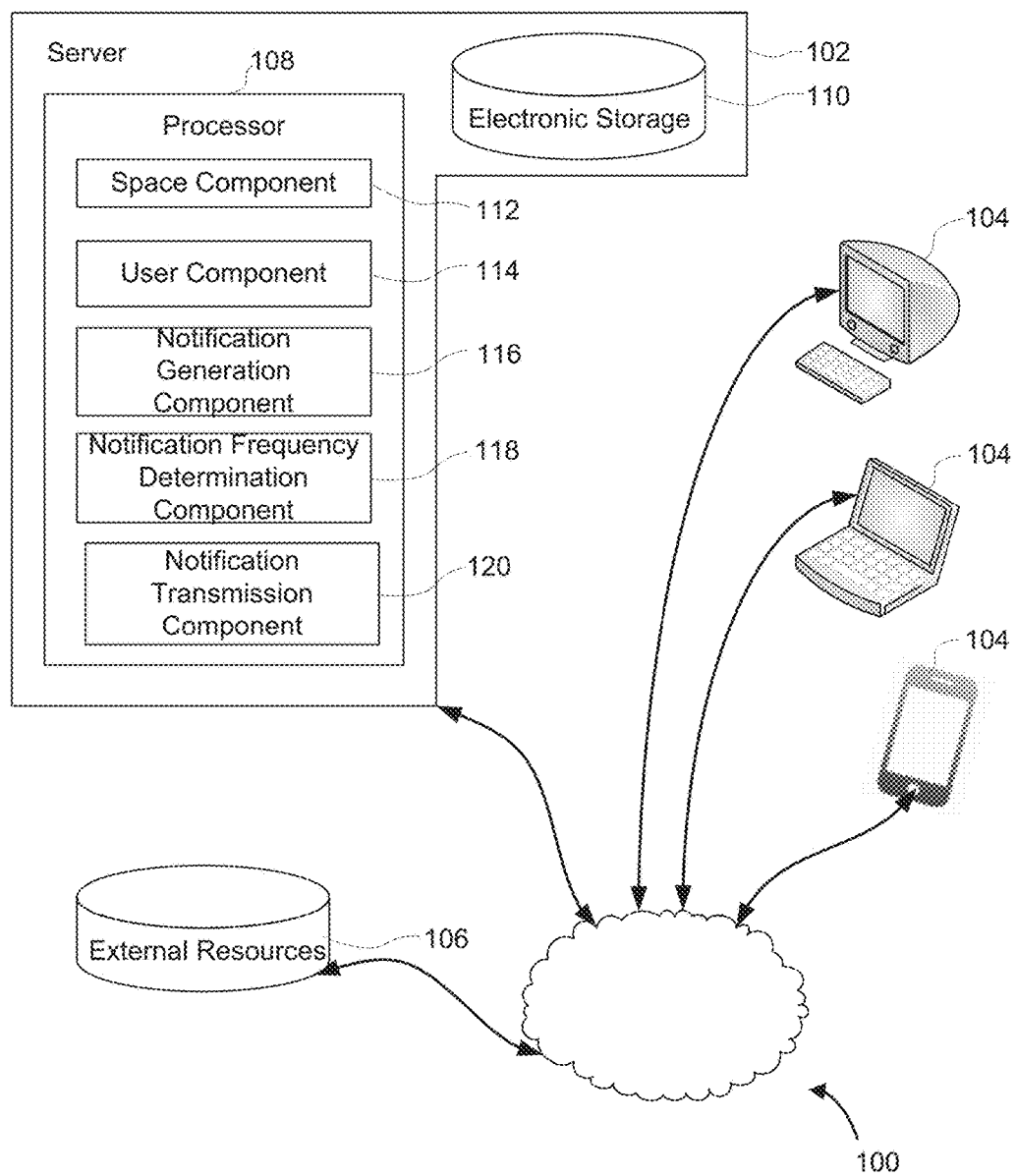
FIG. 1 illustrates a system for facilitating segmented notifications in a virtual space.

FIG. 1 illustrates a system 100 for generating segmented notifications in a virtual space. Providing the virtual space may include hosting the virtual space over a network. In some implementations, system 100 may include a server 102. The server 102 may be configured to communicate with one or more client computing platforms 104 according to a client/server architecture. The users may access system 100 and/or the virtual space via client computing platforms 104. The server 102 may comprise a processor 108 configured to execute computer readable instructions to implement system components. The computer program components may include one or more of a space component 112, a user component 114, a notification generation component 116, a notification frequency determination component 118, a notification transmission module 120, and/or other components.

The space components 112 may be configured to execute an instance of the virtual space in which an online game takes place. Within the instance of the virtual space, the users may interact with virtual space elements and/or with each other through gameplays provided by the online game. The gameplays may include role-playing, first-person shooter, real-time strategy, turn-based strategy, simulation, music or rhythm playing, social interaction, twitching and/or any other gameplays. The execution of the instance of the virtual space by space component 112 may include determining the state communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space and/or the online game that takes place therein may be persistent. That is, the virtual space and/or the online game may continue on whether or not individual users are currently logged in and/or participating in the virtual space. A user that logs out of the virtual space and then logs back in some time later may find the game space has been changed through the interactions of other users with the game space during the time the user was logged out. These changes may include changes to the simulated physical space, changes in the user's inventory, changes in other users' inventories, changes experienced by non-user characters, and/or other changes.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the virtual space may comprise virtual space entities automatically controlled in the instance of the virtual space. Such virtual space entities may not be associated with any user. As such, the automatically controlled virtual space entities may be generated and/or developed by artificial intelligence configured with the server 102 by a provider, administrator, moderator, and/or any other entities related to the virtual space. These automatically controlled entities may evolve within the virtual space free from user controls and may interact with the entities controlled by or associated with the users, other automatically controlled virtual space entities and as well as the topography of the virtual space. Certain manifested traits may be associated with the automatically controlled entities in accordance with the artificial intelligence configured with the server 102. As used herein, such automatically controlled virtual space entities in the instance of the virtual space are referred to as "AI entities".

The above description of the manner in which state of the virtual space is determined by space component 112 is not intended to be limiting. The space component 112 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 112, the users may participate in the instance of the virtual space by controlling one or more of an element in the virtual space. The user controlled elements may include avatars, virtual space characters, virtual space units (e.g., troops), objects (e.g., weapons, horses, vehicle and so on), simulated physical phenomena (e.g., wind, rain, earthquakes, and/or other phenomena), and/or other user controlled elements. The user controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other virtual space entities that may be trained, recruited, captured, and/or otherwise acquired by the users in groups or en mass. The objects controlled by the users may include weapons, vehicles, projectiles, magic items, wardrobes, boots, armor, knapsacks, medicine, healing potion, and/or any other virtual items that may be employed by the users for interaction with the virtual space.

In any case, the user controlled elements may move through and interact with the virtual space (e.g., AI entities, elements controlled by other users and/or topography in the virtual space). The elements controlled by a given user may be created and/or customized by the given user. The given user may have an "inventory" of virtual goods and/or currency usable within the virtual space.

Within the instance of the virtual space executed by space component 112, resources may be, for example, generated, cultivated, prospected, mined, harvested, purchased, earned, traded and/or gifted over time by units, characters, pets, buildings, facilities and/or any other infrastructure or entities in the virtual space for a given user. Resources may include virtual items that are accumulated en masse and then used to satisfy resource requirements in the virtual space. By way of non-limiting examples, virtual space resources may include food (e.g., rice, fish, wheat, etc.), wood, minerals (e.g., good, iron, ore, coal, oil, stone, crystal, etc.), plants, animals, virtual items, virtual currencies, and/or any other resources appropriate for the virtual space. Transfer of resources between users may be reflected through user inventories Controls of virtual elements may be exercised through commands input by a given user through client computing platforms 104. The given user may interact with other users through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through space component 112).

The given user may input commands with specific parameters to undertake specific deeds, actions, functions, sphere of actions and/or any other types of interactions within the virtual space. For example, the given user may input commands to construct, upgrade and/or demolish virtual buildings, harvest and/or gather virtual resources, heal virtual user controlled elements, AI entities and/or elements controlled by other users, train, march, transport, reinforce, reassign, recruit, and/or arrange troops, attack, manage, create, demolish and/or defend cities, realms, kingdoms, and/or any other virtual space locations controlled by or associated with the users, craft or transport virtual items, interact with, compete against or along with AI entities and/or virtual space elements controlled by other users in combats, research technologies and/or skills, mine and/or prospect for virtual resources, complete missions, quests, and/or campaigns, exercise magic power and/or cast spells, and/or perform any other specific deeds, actions, functions, or sphere of actions within the virtual space. In some examples, the given user may input commands to compete against elements in an environment within the virtual space—i.e., PvE activities. In some examples, the given user may input commands to compete against each other within the virtual space—i.e., PvP activities.

The space component 112 may be configured to execute user actions to facilitate interaction of the users with the virtual space and/or each other in response to receiving virtual space commands input by the users. Execution of the user action by the space component 112 may produce changes to the virtual space state, which may reflect progresses and/or results of the user actions. In some examples, state changes caused by the execution of the user actions may be recorded in the electronic storage 122 to facilitate persistency throughout the instance of the virtual space. In some examples, execution of the user actions may not produce persistent changes to the virtual space state (e.g., a user character jumping forward and backward successively may not produce any perceivable game state changes to other users).

The user actions executed by the space component 112 may include combat actions enabling users to direct user entities to compete against AI entities and/or against virtual space elements controlled by other users in combats. The combat actions may include real-time combat actions through which the users may direct user entities (e.g., avatars) to perform maneuvers in real or near-real time; may include turn-based combat actions through which the users may direct user entities (e.g., user character, troops and/or combat equipment) to inflict damages and/or resist damages; may include strategy combat actions through which the users may position the user entities strategically in combats; and/or may include any other types of combat actions.

Within the instance of the virtual space, the users may control virtual space locations to generate revenues, productions, resources, troops, culture, wonders, special units and/or any other types of output enabled by the virtual space locations controlled by the users. The user controlled locations may include virtual space towns, cities, kingdoms, castles, villages, fortresses, land masses, resource cores, and/or any other types of virtual space locations. Typically, through controlling such virtual locations, the users may grow populations, construct infrastructures, conduct commerce, collect taxes, raise troops, train special units, train knights and/or any other user characters, research technologies, gain skills and/or abilities, and/or undertake any other actions, functions, deeds, sphere of actions as enabled by such virtual space locations. For example, a given user may control multiple cities in the virtual space and the cities may generate revenues to fund the given user activities within the virtual space; may generate troops; may generate growth in science; may produce weapons; may generate production; may produce food and so on.

The users may control resource cores in the virtual space. A resource core is a type of virtual space object that may provide specific raw materials, resources, currencies, substances, and/or any other virtual space elements when harvesting actions are performed by user characters with proper skills, equipment, gears, formulas, time duration, and/or any other harvesting parameters. Resource cores may or may not be visible to the users, depending on the user skills. Resource cores may be depleted due to harvesting actions by users and in some examples may be destroyed in the virtual space. In some examples new resource cores may be created to replace the destroyed ones in the virtual space at times determined by the provider, administrator, moderator, and/or any other entities related to the virtual space. Examples of resource cores may include mines, rivers, wells, oceans, swamp, mountains, forests, boxes, pets, plants, and/or any other virtual space locations or objects.

Within the instance of the virtual space, user controlled avatars, characters, objects (e.g., weapons), and/or any other user controlled elements may be associated with virtual space locations. In some examples, such associations may be implicated in the virtual space such that a given user controlled element may be associated with some or all of the virtual space locations controlled by or associated with the given user. In some other examples, such associations may be implicated in the virtual space such that the given user element may be associated with some of the virtual space location controlled by or associated with the given user as however predefined by the provider, administrator, moderator, and/or any other entities related to the virtual space (e.g., the given user character may be only associated with a location where the user character was originally trained and another a location where the user character is currently being stationed at).

Within the instance of the virtual space, AI entities may be associated with virtual space locations as predefined by the provider, administrator, moderator, and/or any other entities related to the virtual space. For example, an AI character may be associated with a virtual space location such that the AI character is supported by the virtual space location (e.g., through production, resources and/or commerce generated by that virtual space location). The virtual space locations associated with AI entities may be controlled automatically by artificial intelligence configured with server 102 and may evolve in accordance with such artificial intelligence within the virtual space.

Within the instance of the virtual space, levels may be established to facilitate and/or incentivize user advancements. Users may receive virtual points for performing actions, participating in virtual space activities, interacting with virtual space elements and/or other users, and/or for engaging in any other interactions provided by the virtual space. A user may advance to a next virtual space level when a certain goal has been reached, an end condition has been fulfilled by the user in the virtual space, and/or the virtual points acquired by the user has reached a threshold corresponding to the next level. Advancements in user levels typically result in attribute boosts, skill boosts, resistance boosts, higher status, and/or any other user progressions in the virtual space. In some examples, for different categories of gameplays, skills, abilities, and/or any other areas that may be progressed by users, different levels may be established. For example, experience levels may be established in the virtual space to reflect overall experiences of the users in the virtual space, levels in certain skills may be established to reflect user progressions in acquiring or mastering these skills in the virtual space, and so on.

The user component 114 may be configured to access and/or manage one or more user profiles and/or user information associated with users of the system 100. The one or more user profiles and/or user information may include information stored by server 102, one or more of the client computing platforms 104, and/or other storage locations. The user information associated with a given user may comprise one or more user parameters related to the given user. The one or more user parameters may include, but not limited to, a language spoken by, a geolocation of, an age group of, a time zone of, a level of experience related to the virtual space by, a level of activity level by the given user, and/or any other user parameters associated with the given user. The level of experience of the given user may include and/or indicate a rank of the user in the virtual space, cumulative experience points (XP) acquired by the given user in the virtual space, a skill level of the given user in the virtual space, a level of progression of the given user in the virtual space, or any other progressive aspects indicating a status of the given user in the virtual space. The activity level may include previous login time(s), previous logout time(s), login frequency, time spent logged in, and/or other activity information.

The user information may include information related to purchases or spending by the given user in or for the virtual space. Such spending information may include, for example, purchase information for individual transactions, a spend rate, a total spend amount, and/or other information related to user purchases. The spending information associated with a given user may indicate a level of spending by the given user within the virtual space, for example, without limitation, lifetime spending (total spending by the given user in the virtual space), average spending during certain predetermined periods (e.g., spending by the given user during thanksgiving, Christmas and/or any other periods), spending by the given user during certain events within the virtual space (e.g., spending by the given user during a specific tournament, quest, contest, and/or any other types of virtual space events), and any other spending information by the given user.

The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users. The user information managed by the user component 114 may include information indicating levels of interaction with the virtual space by individual users. The interaction level of an individual user as indicated in such information may reflect an amount of interaction with the virtual space by the individual user.

The notification generation component 116 may be configured to generate notifications to notify individual users of information related to the virtual space. The notifications generated by notification generation component 116 may notify the individual users of events, activities, news, updates, and/or any other types of state change within the virtual space. This may include notifications of user (including the user's own and other users') developments and/or progression within the virtual space, character (including AI and user character's) progression and/or developments, conditions that have occurred, one or more events that will, are taking place or have completed in the virtual space and/or any other types of state changes within the virtual space. For example, the events that may be notified by the notifications generated by the notification generation component 116 may include trigger events that may impact user progression or user character progression in the virtual space with respect to a given user. Examples of such trigger events may include conclusory events, initiatory events, first party events, third party events, warning events, and/or other types of events. A conclusory event may occur at the end of some process within the virtual space. By way of example, a conclusory event may occur at the end of an upgrade period, at the end of a travel period (e.g., user troops march from one point in the virtual space to another point), at the end of a contest (e.g., between entities controlled by users), at the end of a cool down period, and/or at the end of other processes. An initiatory event may occur at the beginning of a process. An event may be a first party event to a user that initiates the event (or the corresponding process), or the event may be a first party event to a user directly involved in the event (or the corresponding process). An event may be a third party event to a user that did not initiate the event (or corresponding process), or the event may be a third party event to a user that is not directly involved in the event (or corresponding process).

The activities that may be notified by the notifications generated by notification generation component 116 may include campaigns, missions, quests, challenges, secondary games, mini-games, and/or any other types of activities that users may participate in the virtual space. By way of non-limiting example, without limitation, a notification may be generated to notify a given user that the given user is eligible to participate in a mission that is under way within the virtual space and the user may gain experience points by participating in the mission.

The character developments that may be notified by the notifications generated by notification generation component 116 may include skill, level, experience, strength, personality, defense, health, attack and/or any other character attributes progression within the virtual space. The character developments may include those associated with user characters and/or AI characters. The notified character developments may not be necessarily limited to positive character developments, e.g., level up of the characters; the notified character developments may include negative developments, e.g., for example an AI character has lost certain amount of health in defeating an attack and thus may be vulnerable.

The conditions that may be notified by the notifications generated by notification generation component 116 may inform the users that these conditions have been satisfied within the virtual space. The notified conditions may include those predetermined by a provider, administrator, moderator, and/or any other entities related to the virtual space or may be dynamically configured by the users. By way of non-limiting example, without limitation, a user may initiate marching of some troops to a rally point in the virtual space; the marching may take an extended period of time, say 1 day during which the user may not actively participate in the virtual space; absent from user's participation of the user, the troops will nevertheless march to the rally point en route various ragged areas within the virtual space on the way; when in those areas, AI characters may attack the troops; and the user may set a condition for notification such that when the troops engage in a battle in those areas against the AI characters and incur more than 5% troop loss, a notification should be generated and transmitted to the user, e.g., via a push notification. In this way, upon receiving such a notification, the user may log into the virtual space to control the troops either to fight the AI characters more strategically or take detour around a specific ragged area where the user's troops suffer more than 5% losses.

In some examples, the notifications generated by notification generation component 116 may convey information to remind individual users to participate in the virtual space after a period of inactivity. For example, a notifications may be generated to reengage—e.g., "wake up" dormant users the virtual space. For instance, as an illustration, a notification may be generated for a given user to notify him/her that his/her troops need his/her leadership in the virtual space. In some implementations, for incentivizing the dormant users to reengage the virtual space, incentive offers may be included in the notifications. For example, a notification may be generated to remind the user that the user has not logged into the virtual space for 3 days and if the user logs into the virtual space, certain amount of resources may be awarded to the user (e.g., 2 gems).

In some examples, the notifications generated by notification generation component 116 may include incentive offers offering virtual items in exchange of stored consideration from the users. A given virtual item included in such an offer may include one or more of a given virtual item of clothing, a tool, a weapon, a pet, a vehicle, currency, a potion or elixir, ingredients, and/or other virtual items that exist in the virtual space. The given virtual item may provide a functional advantage in the virtual space to its owner (e.g., an advantage in the online game). The given virtual item may be expressed aesthetically within views of the instance of the virtual space. The given virtual item may have value in the virtual space that facilitates trading the virtual item for some other consideration within the virtual space (e.g., for another virtual item, for a service, for an advantage, and/or other consideration). The stored consideration may include, but not limited to, virtual currency, virtual resources, real-world money credits and/or any other stored consideration associated with the users, for example stored in the user accounts managed by the user component 114. The notifications generated by the notification generation component 116 presenting such offers may facilitate the users to accept the offers by transferring the stored consideration the user accounts to the provider of the virtual space, a third party in connection with the virtual space, and/or any other entities that are in connection with offers of the virtual items included in the notifications generated by notification generation component 116.

In any case, the notification generation component 116 may segment the notifications described above for different user segments within the virtual space. Users of the virtual space may be segmented by different parameter values for a set of one or more user parameters, e.g., those managed by the user component 114. As described above, the user parameters may include, but not limited to, a language spoken by, a geolocation of, an age group of, a time zone of, a level of experience related to the virtual space by, a level of activity level by a given user, and/or any other user parameters associated with the given user. By way of non-limiting example, without limitation, a user segment in the virtual space may comprise users physically located in the U.S. age between 15-25; another user segment in the virtual space may comprise users physically located in the US age between 25-40; yet another user segment in the virtual space may comprise users physically located in China age between 18-20; and so on. In another non-limiting example, a user segment in the virtual space may comprise users that have total lifetime spending more than $100 per capita; another user segment in the virtual space may comprise users that have total lifetime spending between $50-$100; yet another user segment in the virtual space may comprise users that have total lifetime spending between $25-$50 and so on. A given user segment as however defined by one or more user parameters may be sub-segmented by additional user parameters. It is understood a "user segment" may be such a sub-segment. For example, within the user segment of physically located in the U.S. between age 15-25, further user segments may be divided based on states these users are located in. In some implementations, the user segments in the virtual space may be determined by the provider, administrator, moderator, and/or any other entities related to the virtual space at a configuration stage of the system 100. In some implementations, the user segments may be determined by the provider, administrator, moderator, and/or any other entities related to the virtual space through a graphical user interface during runtime of the system 100.

In some examples, a given notification about a state change in the virtual space may be segmented for transmission to different user segments with respect to at least contents included in the given notification for different user segments. The contents included in such a notification for different user segments within the virtual space may be differentiated based on parameter values for a set of one or more parameters that segment the users. Such content differentiation for user segments may include differentiation in terms of communication style, format, pattern, and/or any other aspects related to communication of the notification to the user segments, in terms of a language the contents in the notification are expressed in, in terms of culture references used in the contents in the notification, in terms of a level of detail of the contents in the notification and/or differentiation in terms of any other aspects related to the contents in the notification.

Figure 2:
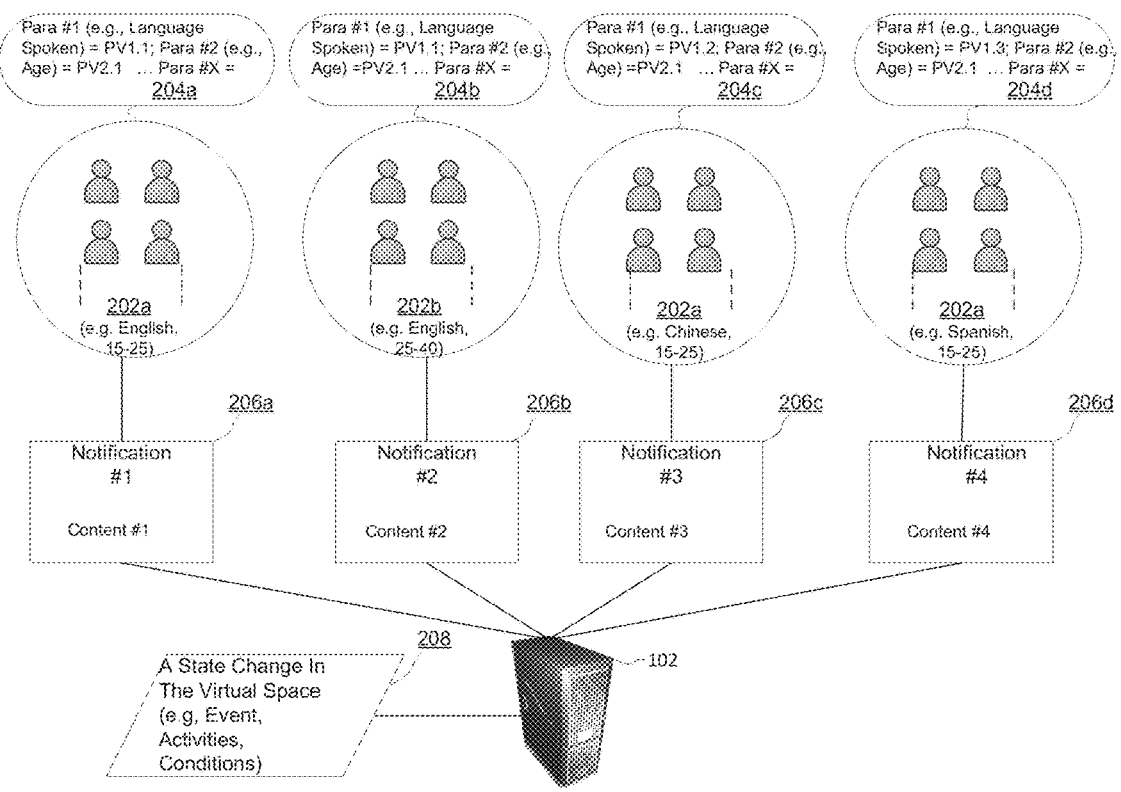
FIG. 2 illustrates one example of segmented user notifications based on different parameter values for a set of user parameters.

FIG. 2 illustrates one example of segmented user notifications based on different parameter values for a set of user parameters. It will be described with references to FIG. 1. As can be seen in this example, one or more notifications 206 may be generated for users 202 in the virtual space as triggered by a stage change in the virtual space. As shown, the event 208 may, for example include an occurrence (including past, current and/or future occurrence) of an event, an activity, a condition and/or any other state changes in the virtual space as described above. As can be seen, in this example, in response to identification of the state change 208, notifications 206 may be generated for the users 202 of the virtual space to notify them about the state change 208 in the virtual space and/or any other information in connection with the state change 208.

As illustrated, the users 202 may be segmented based on a set of user parameters 204 related to various attributes or aspects associated with the users, such as, but not limited to, a language spoken, a level of past spending, a level of activities, an age group, a geographical location, a time zone, a level of experience, a class/race/role assumed in the virtual space, a number of virtual items associated with, and/or any other user parameters. As shown in this example, the users 202 may be segmented based on different values for the user parameters 204 associated with the users. In this example, as illustrated, the users 202 are segmented for a language spoken, an age group and other user parameters.

As still shown in FIG. 2, for the corresponding ones of the segmented users 202a, b, c, d, segmented notifications 206a, b, c, d may be generated with different contents therein. As illustrated, for segmenting the notifications 206, the contents included in the respective notifications 206 may be differentiated with respect to, for example, but not limited to, a level of details of the information conveyed by the respective notifications, a communication pattern, a communication format (e.g., still images, graphical art, animation, video), and/or a communication style in which the contents of the respective notification is presented to the respective user segment; a language in which the content of respective segmented notification is expressed; a culture context in which the content of the respective notification is expressed; a and any other aspects that may segmented the contents of the notifications 206.

For example, the content#1 included in the notifications 206a for user segment 202a—English speaking users between age 15 to 25 may be expressed in a less formal style—e.g., a colloquial communication style popular among English speaking youth. Content #2 included in the notifications 206b for user segment 202b—English speaking users between age 25 and 40 may be expressed in communication appropriate for that age group—e.g., a formal communication style adopted by middle class users of that age group. Content#3 included in the notifications 206c for user segment 202c—Chinese speaking users between age 15 and 25 may be expressed in Chinese using a communication style adopted by youth in China. Content #4 included in the notifications 206d for user segment 202d—Spanish speaking users between age 15 and 25 may be expressed in Spanish using communication style popular among Spanish speaking youth.

In another example, the notifications conveying a state change 208 may be segmented based on a level of experience associated with the users in the virtual space. In that example, the user segment 206a may comprise users having at least experience level (XP) 10 or above in the virtual space. For the user segment 206a, the contents included in the notifications 206a may be express in a level of details with great specificity as to entities, places, characters, events, and/or any other aspects involved in the state change 208. By comparison, for the user segment under level 10, such a notification may be brief without as many details. This may motivate user to progress in the virtual space for receiving enhanced notifications. This may encourage user activity in the virtual space as the less experienced user may be required to explore the virtual space in order to ascertain the details of the notification generated for them.

In still another example, the notifications conveying a state change 208 may be segmented with respect to communication format based on user age. In that example, the notifications 206 about a state change 208 generated for user segment of children younger than 12 may include animations and sounds but no texts; while notifications 206 generated for user segment of users of older age may include texts. This may communicate notifications 206 to user segments effectively in formats understandable to corresponding user segments.

In yet another example, the notifications 206 conveying a given state change 208 in the virtual space may be segmented based on a level of spending by the users in the virtual space. Contents included in notifications generated for users who have spending in the virtual space above a threshold level may be expressed more sensitively (e.g., more politely) than that included in notifications generated for users who have spending in the virtual space less than that threshold level. This may enhance monetization opportunities for the provider of the virtual space.

In another example, the notifications conveying a given state change 208 in the virtual space may be segmented with respect to culture context based on user segments from different cultures. In that example, information conveyed in the notifications 206 for user segment of users from the United States may include terms with culture references (e.g., a slang, a reference to a TV show, a movie, a novel), familiar in the U.S.; information conveyed in the notifications 206 for user segment of users from China may include terms with culture references familiar in China (e.g., a reference to a historical character, idiom, fiction, teaching); and so on.

Returning to FIG. 1, in some implementations, the notification generation component 116 may be configured to determine incentive offers for inclusion in the segmented notifications. The determination of a given incentive offer for inclusion in segmented notifications may involve a determination which virtual item(s) may be included in incentive offers, a determination of the size of discounts included in the incentive offers, a determination of prices for the virtual items included in the incentive offers, and/or a determination of any other offer parameters of incentive offers for inclusion in the segmented notifications generated by the notification generation component 116. Such determinations of the offer parameters may be based on one or more user parameters, such as, for example, an activity level parameter, a user spending parameter, and/or other user parameters. Determination of an incentive offer based on an activity level parameter may include attempting to lure an inactive user back to the virtual space (e.g., making a more valuable offer to less active users). Determination of an incentive offer based on a user spending parameter may include attempting to entice a user to make a larger purchase than usual, attempting to entice a user to spend money for a different type of virtual item, and/or enticing other spending behaviors. Other determinations of virtual items for inclusion in incentive offers in notifications based on user parameters are contemplated.

In those implementations, the incentive offers included in the notification may be segmented for different user segments. By way of non-limiting example, without limitation, the price of a particular virtual item that is on sale in a virtual store within the virtual space may be differentiated in notifications generated for different user segments. For example, as an illustration, for a user segment of users with lifetime spending above a threshold, a first price of a virtual item included in an offer included in a notification presented to that user segment may be determined; for a user segment of users with lifetime spending below that threshold, a second price of a virtual item included in an offer included in a notification presented to that user segment may be determined, wherein the second price may be lower than the first price. This may entice users that do not spend as often in the virtual space to spend.

The notification frequency determination component 118 may be configured to determine notification frequencies at which the notifications generated by the notification generation component 116 may be transmitted to the corresponding users. For different user segments, the determination component 118 may determine different notification frequencies at which notifications generated by the notification generation component 116 may be transmitted to the different user segments. For example, the notification frequency determination component 118 may determine a first frequency at which a notification conveying a given piece of information may be transmitted to a first user segment; and a second frequency, different from the first frequency, at which the notification may be transmitted to a second user segment. By way of non-limiting example, without limitation, a notification reminding user to actively participate in the virtual space may be transmitted at a less frequency to a user segment of users with individual lifetime spending above a threshold; and by comparison such a notification may be transmitted to a user segment of users with individual lifetime spending below a threshold. Other determinations of notification frequencies based on other user parameters are contemplated.

The notification transmission component 120 may be configured to effectuate transmission of notifications through electronic communication media internal and/or external to virtual space. This may include determining one or more of communication media through which the notification may be transmitted to the corresponding users, and/or other aspects of the notifications. Determining the communication media may include selecting one or more communication media, e.g., email, text, instant message, push notification, voice, visual alert and/or other media for a given notification to the corresponding users. For example, notification transmission component 120 may effectuate transmission of notifications to different user segments using different communication media. For example, a given notification generated by the notification generation component 116 may be transmitted to a user segment of users of age between 15 and 15 using instance message; may be transmitted to a user segment of users of age between 25 and 40 using email; and so on.

Communication media external to the virtual space may include communication media not relayed to the users by server 102. Instead, such communication may be relayed to the users through an external service provider. As notifications are transmitted to users, records of such transmissions may be made (e.g., in the user accounts). The records may include information about one or more of a format of the notifications, the state changes that triggered the notifications, the content in the notifications, the communication media used to transmit the notifications, and/or other information about the notifications. These records may be used by space component 112, notification generation component 116, used by notification frequency determination component 118, and/or other modules.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118, 120. Processor 108 may be configured to execute components 112, 114, 116, 118, 120 by software; hardware; firmware; some combination of software, hardware, and/or firmware; and/or other mechanisms for configuring processing capabilities on processor 108.

It should be appreciated that although components 112, 114, 116, 118, 120 are illustrated in FIG. 1 as being co-located within a single processing unit, in implementations in which processor 108 includes multiple processing units, one or more of components 112, 114, 116, 118, 120 may be located remotely from the other components. The description of the functionality provided by the different components 112, 114, 116, 118, 120 described below is for illustrative purposes, and is not intended to be limiting, as any of components 112, 114, 116, 118, 120 may provide more or less functionality than is described. For example, one or more of components 112, 114, 116, 118, 120 may be eliminated, and some or all of its functionality may be provided by other ones of components 112, 114, 116, 118, 120. As another example, processor 108 may be configured to execute one or more additional components that may perform some or all of the functionality attributed below to one of components 112, 114, 116, 118, 120.

Figure 3:
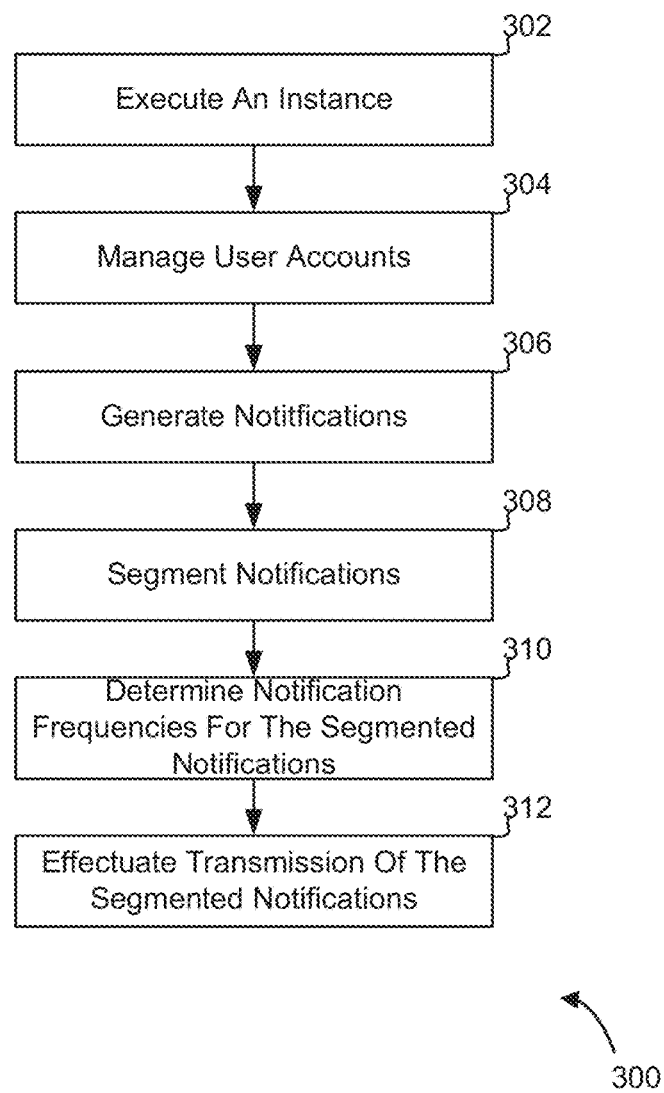
FIG. 3 illustrates one exemplary method for facilitating segmented notifications in a virtual space in accordance with the disclosure.

FIG. 3 illustrates one exemplary method 300 for facilitating segmented notifications in a virtual space in accordance with the disclosure. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a virtual space may be executed and implemented to determine view information for transmission to one or more client computing platforms associated with users. The users may interact with the virtual space by initiating virtual space commands to perform user actions. The user actions may be executed in the virtual space. In some implementations, operation 302 may be performed by a space component the same as or similar to space component 112 (shown in FIG. 1 and described herein).

At an operation 304, user accounts associated with the users may be managed. The user accounts may include a first account associated with the first user. The first account may include an inventory of virtual items for the first user. In some implementations, operation 304 may be performed by a user component the same as or similar to user component 114 (shown in FIG. 1 and described herein).

At operation 306, notifications about a state change within the virtual space may be generated for users of the virtual space. The notifications generated in operation 306 may notify the users of events, activities, news, updates, and/or any other types of state change within the virtual space. In some examples, the notifications generated in operation 306 may convey information to remind individual users to participate in the virtual space after a period of inactivity. In some examples, the notifications generated in operation 306 may include incentive offers offering virtual items in exchange of stored consideration from the users. In some implementations, operation 306 may be performed by a notification generation component the same as or similar to notification generation component 116 (shown in FIG. 1 and described herein).

At an operation 308, notifications generated in operation 306 may be segmented. Users of the virtual space may be segmented by different parameter values for a set of one or more user parameters managed in operation 304. For different user segments, the notifications may be segmented with respect to at least contents included in the notifications. The content differentiation may include differentiation in terms of communication style, format, pattern, and/or any other aspects related to communication of the notification to the user segments, in terms of a language the contents in the notification are expressed in, in terms of culture references used in the contents in the notification, in terms of a level of detail of the contents in the notification and/or differentiation in terms of any other aspects related to the contents included in the notification. In some implementations, operation 308 may be performed by a notification generation component the same as or similar to notification generation component 116 (shown in FIG. 1 and described herein).

At an operation 310, frequencies for transmitting the notifications generated and segmented in operation 306 and 308 respectively may be determined. For different user segments, the notifications may be transmitted at different frequencies to different user segments. For example, the notification frequency determination component may determine a first frequency at which a notification conveying a given piece of information may be transmitted to a first user segment; and a second frequency, different from the first frequency, at which the notification may be transmitted to a second user segment. In some implementations, operation 310 may be performed by notification frequency determination component the same as or similar to notification frequency determination component 118 (shown in FIG. 1 and described herein).

At an operation 312, the transmission of the notifications to the different user segments may be effectuated. Operation 312 may include determining one or more of communication media through which the notification may be transmitted to the corresponding users, and/or other aspects of the notifications. Determining the communication media may include selecting one or more communication media, e.g., email, text, instant message, push notification, and/or other media for a given notification to the corresponding users. In some implementations, operation 312 may be performed by a notification transmission module the same as or similar to notification transmission module 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating segmented notifications based on user parameters in a virtual space in which an online game takes place, the system comprising:
   one or more physical processors configured by machine-readable instructions to:
      execute an instance of a virtual space in which the online game takes place, facilitate presentation of views of the virtual space to users through client computing platforms that are associated with the users and operatively linked to the system via a network, and enable user interactions with the virtual space and/or other users by receiving and executing commands from the users, wherein interactions between the users are supported through communications exchanged within the virtual space;
      manage user accounts associated with the individual users, the user accounts including:
         (i) external communication media preferences, wherein the external communication media preferences define one or more electronic communication media external to the virtual space through which individual users prefer to receive notifications, and wherein the external communication media preferences are associated with the individual users, and (ii) user parameters related to the individual users such that the user accounts include accounts associated with a first set of one or more users having a first user parameter value for a first user parameter, and accounts associated with a second set of one or more users having a second user parameter value for the first user parameter, wherein the first user parameter represents spending information related to spending by an individual user within the virtual space, wherein the spending information includes one or more of a spend rate by the individual user that reflects an average amount spent by the individual user within the virtual space per a real-world unit of time, a total spend amount by the individual user, average spending by the individual user during one or more predetermined periods, and spending by the individual user during certain events within the virtual space, wherein the first and second user parameter values are distinct and separate from each other;

automatically generate the notifications that convey information to encourage the users to participate in the virtual space and include information about events and/or activities within the virtual space that the users could have participated in without receiving the notification, the notifications being generated based on user parameter values of the user parameters related to the individual users the notifications are intended for and will be transmitted to, such that a first notification is generated for the first set of one or more users based on the first user parameter value, and a second notification is generated for second set of one or more users based on the second user parameter value, wherein the first and second notifications are separate and distinct from each other in content; and effectuate transmissions of the notifications through the one or more electronic communication media external to the virtual space such that the first notification is transmitted to the first set of one or more users and the second notification is transmitted to the second set of one or more users, wherein transmissions of the notifications to the individual users use the one or more electronic communication media external to the virtual space in accordance with the external communication media preferences per individual user.

2. The system of claim 1, wherein the user parameters further include one or more of a language spoken by, a level of experience of, a level activity associated with, and a time zone associated with corresponding ones of the individual users.

3. The system of claim 1, wherein the first and second notifications are generated in response to occurrence of a first trigger event that impacts both the first set of one or more users and the second set of one or more users.

4. The system of claim 1, wherein the first and second notifications are separate and distinct from each other at least in one aspect related to contents of the first and second notifications.

5. The system of claim 4, wherein the at least one aspect related to the contents of the first and second notifications by which the first and second notifications are separate and distinct includes a language, a level of detail, a communication pattern, a communication format, and/or a communication style of the first and second notifications.

6. The system of claim 5, wherein the communication format includes text, still image, graphical art, animation, video, 3D graphics, and/or audio.

7. The system of claim 1, wherein first and second notifications both include an incentive offer of one or more virtual items usable in the virtual space, wherein the one or more virtual items are offered in exchange of first stored consideration from the first set of one or more users in the first notification, and the one or more virtual items are offered in exchange of second stored consideration from the second set of one or more users in the second notification, the first and second stored consideration being separate and distinct from each other.

8. The system of claim 1, wherein the one or more physical processors are further configured to determine frequencies at which the notifications to be transmitted to the individual users based on the user parameters related to the individual users such that a first frequency is determined for transmitting the first notification to the first set of one or more users based on the first user parameter value and the second frequency is determined for transmitting the second notification to the second set of one or more users based on the second user parameter value, and wherein the first notification is transmitted to first set of one or more users at the first frequency and the second notification is transmitted to the second set of one or more users at the second frequency, the first and second frequencies being distinct and discrete from each other.

9. The system of claim 1, the electronic communication medium via which the first and second notifications are transmitted includes an electronic mail, an instant message, a text message, a push notification, a voice notification, and/or a visual alert.

10. The system of claim 1, wherein the users include a first user and a second user, wherein the first set of one or more users includes the first user, wherein the second set of one or more users includes the second user, wherein the first notification is transmitted to the first user through a first external communication medium that is external to the virtual space in accordance with the external communication media preferences associated with the first user, and wherein the second notification is transmitted to the second user through a second external communication medium that is external to the virtual space in accordance with the external communication media preferences associated with the second user.

11. A method for facilitating segmented notifications based on user parameters in a virtual space in which an online game takes place, the method being implemented in one or more physical processors configured to execute computer programs, the method comprising:

executing an instance of a virtual space in which the online game takes place, facilitating presentation of views of the virtual space to users through client computing platforms that are associated with the users and operatively linked to the one or more physical processors via a network, and enabling user interactions with the virtual space and/or other users by receiving and executing commands from the users, wherein interactions between the users are supported through communications exchanged within the virtual space;

managing user accounts associated with the individual users, the user accounts including:

(i) external communication media preferences, wherein the external communication media preferences define per individual user one or more electronic communication media external to the virtual space through which individual users prefer to receive notifications, and wherein the external communication media preferences are associated with the individual users, and (ii) user parameters related to the individual users such that the user accounts include accounts associated with a first set of one or more users having a first user parameter value for a first user parameter, and accounts associated with a second set of one or more users having a second user parameter value for the first user parameter, wherein the first user parameter represents spending information related to spending by an individual user within the virtual space, wherein the spending information includes one or more of a spend rate by the individual user that reflects an average amount spent by the individual user within the virtual space per a real-world unit of time, a total spend amount by the individual user, average spending by the individual user during one or more predetermined periods, and spending by the individual user during certain events within the virtual space, wherein the first and second user parameter values are distinct and separate from each other;

automatically generating the notifications that convey information to encourage the users to participate in the virtual space and include information about events and/or activities within the virtual space that the users could have participated in without receiving the notification, the notifications being generated based on user parameter values of the user parameters related to the individual users the notifications are intended for and will be transmitted to, such that a first notification is generated for the first set of one or more users based on the first user parameter value, and a second notification is generated for second set of one or more users based on the second user parameter value, wherein the first and second notifications are separate and distinct from each other in content; and effectuating transmissions of the notifications through the one or more electronic communication media external to the virtual space such that the first notification is transmitted to the first set of one or more users and the second notification is transmitted to the second set of one or more users, wherein transmissions of the notifications to the individual users use the one or more electronic communication media external to the virtual space in accordance with the external communication media preferences per individual user.

12. The method of claim 11, wherein the user parameters further include a language spoken by, a level of experience of, a level activity associated with, and a time zone associated with corresponding ones of the individual users.

13. The method of claim 11, wherein the first and second notifications are generated in response to occurrence of a first trigger event that impacts both the first set of one or more users and the second set of one or more users.

14. The method of claim 11, wherein the first and second notifications are separate and distinct from each other at least in one aspect related to contents of the first and second notifications.

15. The method of claim 14, wherein the at least one aspect related to the contents of the first and second notifications by which the first and second notifications are separate and distinct includes a language, a level of detail, a communication pattern, a communication format, and/or a communication style of the first and second notifications.

16. The method of claim 15, wherein the communication format includes text, still image, graphical art, animation, video, 3D graphics, and/or audio.

17. The method of claim 11, wherein first and second notifications both include an incentive offer of one or more virtual items usable in the virtual space, wherein the one or more virtual items are offered in exchange of first stored consideration from the first set of one or more users in the first notification, and the one or more virtual items are offered in exchange of second stored consideration from the second set of one or more users in the second notification, the first and second stored consideration being separate and distinct from each other.

18. The method of claim 11, further comprising determining frequencies at which the notifications to be transmitted to the individual users based on the user parameters related to the individual users such that a first frequency is determined for transmitting the first notification to the first set of one or more users based on the first user parameter value and the second frequency is determined for transmitting the second notification to the second set of one or more users based on the second user parameter value, and wherein the first notification is transmitted to first set of one or more users at the first frequency and the second notification is transmitted to the second set of one or more users at the second frequency, the first and second frequencies being distinct and discrete from each other.

19. The method of claim 11, the electronic communication medium via which the first and second notifications are transmitted includes an electronic mail, an instant message, a text message, a push notification, a voice notification, and/or a visual alert.

20. The method of claim 11, wherein the users include a first user and a second user, wherein the first set of one or more users includes the first user, wherein the second set of one or more users includes the second user, wherein the first notification is transmitted to the first user through a first external communication medium that is external to the virtual space in accordance with the external communication media preferences associated with the first user, and wherein the second notification is transmitted to the second user through a second external communication medium that is external to the virtual space in accordance with the external communication media preferences associated with the second user.

* * * * *